(12) United States Patent
Kim et al.

(10) Patent No.: US 9,285,953 B2
(45) Date of Patent: Mar. 15, 2016

(54) DISPLAY APPARATUS AND METHOD FOR INPUTTING CHARACTERS THEREOF

(71) Applicant: SAMSUNG ELECTRONICS CO., LTD., Suwon-si (KR)

(72) Inventors: Min-jin Kim, Pyeongtaek-si (KR); Sung-gook Kim, Seoul (KR); Yong-deok Kim, Anyang-si (KR); Byuk-sun Kim, Seoul (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 13/753,737

(22) Filed: Jan. 30, 2013

(65) Prior Publication Data
US 2014/0115538 A1 Apr. 24, 2014

(30) Foreign Application Priority Data
Oct. 18, 2012 (KR) .......................... 10-2012-0116065

(51) Int. Cl.
*G06F 3/048* (2013.01)
*G06F 3/0482* (2013.01)
*G06F 3/023* (2006.01)
(Continued)

(52) U.S. Cl.
CPC ............ *G06F 3/0482* (2013.01); *G06F 3/0236* (2013.01); *G06F 3/0237* (2013.01); *G06F 3/048* (2013.01); *G06F 3/04886* (2013.01); *H04N 21/42228* (2013.01)

(58) Field of Classification Search
CPC ........ G06F 3/023; G06F 3/048; G06F 3/0482

USPC .......................................................... 715/825
See application file for complete search history.

(56) References Cited

U.S. PATENT DOCUMENTS

| 5,706,450 A | 1/1998 | Shaiman et al. |
| 6,307,548 B1 | 10/2001 | Flinchem et al. |

(Continued)

FOREIGN PATENT DOCUMENTS

| EP | 1953623 A1 | 8/2008 |
| JP | 2005-032189 A | 2/2005 |

(Continued)

OTHER PUBLICATIONS

Turn off autocomplete for input, taken from Css-trics.com, published May 2010, pp. 1-17.*

(Continued)

*Primary Examiner* — William Bashore
*Assistant Examiner* — Gregory A Distefano
(74) *Attorney, Agent, or Firm* — Sughrue Mion, PLLC

(57) ABSTRACT

A display apparatus and a method for inputting characters thereof are provided. The display apparatus includes: a display unit which displays a character input UI including a plurality of character items, each character item comprising a border and a character located in the border, an input unit which receives a user command to select one of the plurality of character items, and, a controller which, if a first character item is selected from among the plurality of character items through the input unit, controls the display unit to display at least one recommended character item associated with the first character to partially overlap with character items adjacent to the first character item. Accordingly, a user can input characters more easily using the character input UI.

50 Claims, 18 Drawing Sheets

(51) Int. Cl.
*G06F 3/0488* (2013.01)
*H04N 21/422* (2011.01)

(56) References Cited

U.S. PATENT DOCUMENTS

| | | | |
|---|---|---|---|
| 6,445,934 | B1 | 9/2002 | Khazaka |
| 7,443,316 | B2 | 10/2008 | Lim |
| 8,296,680 | B2 | 10/2012 | Griffin et al. |
| 9,092,134 | B2 * | 7/2015 | Figura ................ G06F 3/04886 |
| 2002/0183100 | A1 * | 12/2002 | Parker .......................... 455/566 |
| 2003/0237055 | A1 * | 12/2003 | Lange et al. .................. 715/530 |
| 2007/0075978 | A1 * | 4/2007 | Chung ................. G06F 3/0237 |
| | | | 345/173 |
| 2007/0216659 | A1 | 9/2007 | Amineh |
| 2008/0167858 | A1 * | 7/2008 | Christie et al. .................. 704/10 |
| 2008/0180403 | A1 * | 7/2008 | Park et al. ..................... 345/173 |
| 2009/0058823 | A1 | 3/2009 | Kocienda |
| 2010/0225599 | A1 * | 9/2010 | Danielsson et al. .......... 345/173 |
| 2011/0099506 | A1 | 4/2011 | Gargi et al. |
| 2011/0119623 | A1 | 5/2011 | Kim |
| 2011/0148787 | A1 | 6/2011 | Kim |
| 2012/0047454 | A1 | 2/2012 | Harte et al. |
| 2012/0063407 | A1 | 3/2012 | Park et al. |
| 2012/0254786 | A1 | 10/2012 | Colley |
| 2013/0021250 | A1 | 1/2013 | Griffin et al. |
| 2013/0125037 | A1 * | 5/2013 | Pasquero et al. .............. 715/773 |

FOREIGN PATENT DOCUMENTS

| | | | |
|---|---|---|---|
| JP | 2006293797 | A | 10/2006 |
| JP | 2006302318 | A | 11/2006 |
| JP | 2010-165226 | A | 7/2010 |
| JP | 2010165226 | A * | 7/2010 |
| JP | 2010-198646 | A | 9/2010 |
| JP | 2010-237973 | A | 10/2010 |
| JP | 2011-210149 | A | 10/2011 |
| KR | 2002-0027063 | A | 4/2002 |
| KR | 10-0552085 | B1 | 2/2006 |
| KR | 1020110054598 | A | 5/2011 |
| KR | 1020120063407 | A | 6/2012 |
| WO | 2007047188 | A2 | 4/2007 |
| WO | 2009034220 | A1 | 3/2009 |
| WO | 2012-076743 | A1 | 6/2012 |

OTHER PUBLICATIONS

Communication dated Mar. 15, 2013 from the Korean Intellectual Property Office in counterpart application No. 10-2012-0116065.
Communication dated Aug. 4, 2014 issued by the European Patent Office in counterpart European Patent Application No. 13 153 267.3.
Communication, dated Jan. 28, 2014, issued by the Japanese Patent Office in counterpart Japanese Application No. 2013-070556.
Communication, dated Mar. 6, 2014, issued by the European Patent Office in counterpart European Application No. 13153267.3.
Communication, dated Mar. 18, 2014, issued by the European Patent Office in counterpart European Application No. 13 158 267.3.
Written Opinion (PCT/ISA/237) dated Jul. 30, 2013 from the International Searching Authority in counterpart Application No. PCT/KR2013/003239.
International Search Report (PCT/ISA/210) dated Jul. 30, 2013 issued by the International Searching Authority in counterpart Application No. PCT/KR2013/003239.
Communication issued on Mar. 25, 2015 by the European Patent Office in related Application No. 13153267.3.
Communication dated Nov. 18, 2014 issued by the Int. Searching Authority in counterpart Communication Application No. PCT/KR2014/007089 (PCT/ISA/210).
Communication dated Nov. 18, 2014 issued by the Int. Searching Authority in counterpart Application No. PCT/KR2014/007089 (PCT/ISA/237).
Intention to Grant issued on Jan. 4, 2016 by the European Patent Office in related Application No. 13153267.3.

* cited by examiner

DISPLAY APPARATUS AND METHOD FOR INPUTTING CHARACTERS THEREOF

CROSS-REFERENCE TO RELATED APPLICATION

This application claims priority from Korean Patent Application No. 10-2012-0116065, filed on Oct. 18, 2012, in the Korean Intellectual Property Office, the disclosure of which is incorporated herein by reference in its entirety.

BACKGROUND

1. Field

Methods and apparatuses consistent with exemplary embodiments relate to a display apparatus and a method for inputting characters thereof, and more particularly, to a display apparatus which can provide a recommended character icon on a character input user interface (UI) displayed on a display unit, and a method for inputting characters thereof.

2. Description of the Related Art

Modern display apparatuses do not unilaterally provide functions or information to users and provide a variety of functions or information in response to a user's request. For example, televisions (TVs) released in recent years provide a user interaction function such as an application executing function or a web-browsing search function, as well as a broadcast receiving function.

Therefore, the modern display apparatus provides a character input user interface (UI) (for example, a virtual keyboard) to a user to receive a user's request. However, if the user inputs a character using such a character input UI, the user has difficulty in moving a pointer. In particular, if the character input UI is provided on a big-size display apparatus such as a TV, the character input UI displayed on the TV has a big size so that it takes much time for the user to input a character using the pointer.

In order to solve the above problem, the display apparatus employs a function of providing a recommended character on the character input UI for the sake of simpler character input. For example, U.S. Patent Publication No. 2011-0099506 and U.S. Pat. No. 7,443,316 disclose display apparatuses which provide a recommended character around a character selected by a user.

However, in U.S. Patent Publication No. 2011-0099506, a recommended character item displayed on a character input UI does not have a separate key border and is not superimposed on an adjacent character item, so that a user has difficulty in selecting the recommended character item. Also, in U.S. Pat. No. 7,443,316, a recommended character item displayed on a character input UI hides another character item, so that a user cannot select the hidden character item.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which displays a recommended character item associated with a selected character item to partially overlap with the selected character item on a character input UI, so that a user can more easily input characters using the character input UI, and a method for inputting characters thereof.

According to an aspect of an exemplary embodiment, there is provided a display apparatus including: a display which displays an input user interface (UI) including a plurality of character items, an inputter configured to receive a command to select one of the plurality of character items, and a controller configured to determine at least one recommended character item associated with a first character item, if the first character item is selected from among the plurality of character items, wherein the at least one recommended character item is displayed to overlap with a character item adjacent to the first character item.

If a first recommended character item is selected from among the at least one recommended character item through the inputter, the controller may control the display unit to display at least one new recommended character item associated with a combination of a character included in the first character item and a character included in the first recommended character item around the first character item.

After the at least one recommended character item is selected, if a second character item other than the first character item and the at least one recommended character item is selected, the controller may control the display to display at least one recommended character item associated with a combination of a character included in the first character item and a character included in the second character item around the second character item.

The display apparatus may further include a storage which stores a dictionary database and a user database in which information related to words that a user has used is recorded, and the controller may search for at least one character that is likely to follow a character included in the first character item, as at least one recommended character associated with a character included in the first character item, using the dictionary database and the user database, and may display the searched at least one character. The storage may also be a separate device, external to the display apparatus.

If the first character item is selected through the inputter, the controller may control the display to display a refresh item in the input UI, and, if the refresh item is selected through the inputter, the controller may change a character included in the at least one recommended character item associated with the character included in the first character item to at least one likely next character from among characters that follow the character included in the first character item.

The controller may control the display to display the refresh item on a region on which the at least one recommended character item is displayed.

If a combination of characters input through the inputter is one of words that are stored in at least one from among the dictionary database and the user database, and is capable of forming a new word using other characters, the controller may control the display to additionally display at least one function item in addition to the at least one recommended character item.

If a combination of characters input through the inputter is one of words that are stored in at least one from among the dictionary database and the user database and is not capable of forming a new word using other characters, the controller may control the display to display at least one function item.

If a combination of characters input through the inputter is not a word that is stored in at least one from among the dictionary database and the user database, the controller may control the display to display at least one function item at a region at which the at least one recommended character item is to be displayed.

The at least one function item may include at least one from among a space item to perform a space bar function, an enter key item to perform an enter key function, a delete item to delete a previously input character, and a special character item to input a special character.

If a command to input a word that is not stored in the dictionary database is received using the displayed at least one function item, the controller may record the word corresponding to the input command in the user database.

If a password is input using the input UI, the controller may not display the at least one recommended character item.

If a recommended character determined for the first character item is a same character as a character included in a character item located within a predetermined distance from the first character item, the controller may change the recommended character.

The at least one recommended character item associated with the first character item may be placed on a corner of the first character item to overlap with character items adjacent to the first character item.

The controller may display the plurality of character items included in the input UI and the at least one recommended character item in different ways.

If a recommended character determined for the first character item is a same character as a character included in a character item which is located within a predetermined distance from the first character item, the controller may display the character item located within the predetermined distance and the at least one recommended character item in a different way from that of other character items included in the input UI.

The inputter may be at least one from among a pointing device, a motion sensor, a mouse, a remote controller, and a touch panel.

According to an aspect of another exemplary embodiment, there is provided a method for inputting characters, the method including: displaying an input user interface (UI) including a plurality of character items; and if a first character item is selected from among the plurality of character items determining at least one recommended character item associated with the first character item and displaying the at least one recommended character item, wherein the at least one recommended character item is displayed to overlap with a character item adjacent to the first character item.

The method may further include if a first recommended character item is selected from among the at least one recommended character item, displaying at least one new recommended character item associated with a combination of a character included in the first character item and a character included in the first recommended character item around the first character item.

The method may further include after the at least one recommended character item is displayed, if a second character item other than the first character item and the at least one recommended character item is selected displaying at least one recommended character item associated with a combination of a character included in the first character item and a character included in the second character item around the second character item.

The method further includes searching for at least one character that is likely to follow a character included in the first character item, as at least one recommended character associated with a character included in the first character item, using at least one from among a dictionary database and a user database in which information on words that a user has used is recorded, and displaying the searched at least one character.

The method may further comprise: if the first character item is selected, displaying a refresh item in the input UI, and if the refresh item is selected, changing a character included in the at least one recommended character item associated with the character included in the first character item to at least one likely next character from among characters that follow the character included in the first character item.

The displaying the refresh item may include displaying the refresh item on a region on which the at least one recommended character item is displayed.

The method may further include, if a combination of characters input by a user is one of words that are stored in at least one from among the dictionary database and the user database and is capable of forming a new word using other characters, additionally displaying at least one function item in addition to the at least one recommended character item.

The method may further include, if a combination of characters input by a user is one of words that are stored in at least one from among the dictionary database and the user database and is not capable of forming a new word using other characters, displaying at least one function item.

The method may further include, if a combination of characters input by a user is not a word that is stored in at least one from among the dictionary database and the user database, displaying at least one function item on a region on which the at least one recommended character item is to be displayed.

The at least one function item may include at least one from among a space item to perform space bar function, an enter key item to perform an enter key function, a delete item to delete a previously input character, and a special character item to input a special character.

The method may further include, if a command to input a word that is not stored in the dictionary database is received using the displayed at least one function item, recording the word corresponding to the input command in the user database.

The method may further comprise, if a password is input using the input UI, not displaying the at least one recommended character item.

The method may further comprise, if a recommended character determined for the first character item is a same character as a character included in a character item which is located within a predetermined distance from the first character item, changing the recommended character and displaying the changed recommended character.

The method may further comprise displaying the at least one recommended character item associated with the first character item on a corner of the first character item to overlap with character items adjacent to the first character item.

The method may further comprise displaying the plurality of character items included in the character input UI and the at least one recommended character item in different ways.

The method may further comprise, if a recommended character determined for the first character item is a same character as a character included in a character item which is located within a predetermined distance from the first character item, displaying the character item located within the predetermined distance and the at least one recommended character item in a different way from that of other character items included in the input UI.

A display apparatus performs the displaying operations and the display apparatus may receive a user command using at least one from among a pointing device, a motion sensor, a mouse, a remote controller, and a touch panel.

According to an aspect of still another exemplary embodiment, there is provided a display apparatus including: a display displays an input UI including a plurality of character items; an inputter configured to receive a command to select one of the plurality of character items; a storage which stores at least one from among a dictionary database and a user database in which information on words that have been used is recorded; and a controller configured to control the display unit to display at least one function item around an input character if a combination of characters input through the inputter is a word that is not recorded in the at least one from among dictionary database and the user database.

The at least one function item may include at least one from among a space item to perform a space bar function, an enter key item to perform an enter key function, a delete item to delete a previously input character, and a special character item to input a special character.

If a combination of characters input through the inputter is a word that is not recorded in the dictionary database and the user database, and if one of the space item and the enter key item is selected, the controller may record the combination of the input characters on the user database.

According to an aspect of still another exemplary embodiment, there is provided a method for inputting characters, the method including: displaying an input user interface (UI) including a plurality of character items, receiving a plurality of characters through the input UI, and, if a combination of the input plurality of characters is a word that is not recorded in at least one from among a dictionary database and a user database, displaying at least one function item around an input character.

The at least one function item may include at least one from among a space item to perform a space bar function, an enter key item to perform an enter key function, a delete item to delete a previously input character, and a special character item to input a special character.

The method may further include, if one from among the space item and the enter key item of the at least one function item is selected, recording the combination of the input characters in the user database.

Each character item may comprise a border and a character located in the border.

The at least one recommended character item may partially overlap with the character item adjacent to the first character item.

The character item adjacent to the first character item may be selectable by a user.

The controller may first search the user database prior to searching the dictionary database for the at least one character that is likely to follow the character included in the first character item.

The controller may display the at least one recommended character item by making the at least one recommended character item flicker and/or highlighting the at least one recommended character item.

The character associated with the selected first recommended character item may be displayed in a same location of a character associated with the first character item.

The controller may control the display to display only the at least one function item instead of the at least one recommended character item.

According to an aspect of yet another exemplary embodiment, there is provided a non-transitory computer readable medium which stores a program for executing a method for inputting characters. The method comprises: displaying an input user interface (UI) comprising a plurality of character items; and if a first character item is selected from among the plurality of character items, determining at least one recommended character item associated with the first character item and displaying the at least one recommended character item, wherein the at least one recommended character item is displayed to overlap with a character item adjacent to the first character item.

According to yet another aspect of an exemplary embodiment, there is provided a non-transitory computer readable medium which stores a program for executing a method for inputting characters. The method comprises: displaying an input user interface (UI) comprising a plurality of character items; receiving a plurality of characters through the input UI; and if a combination of the input plurality of characters is a word that is not recorded in at least one from among a dictionary database and a user database, displaying at least one function item around an input character.

According to yet another aspect of an exemplary embodiment, there is provided a user interface which comprises: at least a virtual keyboard comprising a plurality of character items, wherein the virtual keyboard is configured to receive a command to select one of the plurality of character items, wherein at least one recommended character item associated with a first character item is determined, if the first character item is selected from among the plurality of character items, and wherein the at least one recommended character item is displayed to overlap with a character item adjacent to the first character item. The at least one recommended character item may be determined by using a database.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
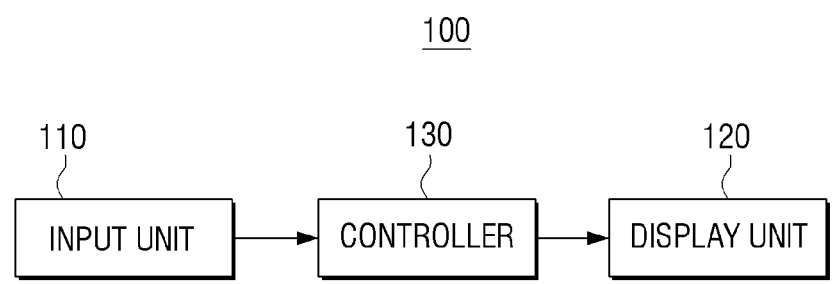
FIG. 1 is a block diagram schematically illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram schematically illustrating a display apparatus according to an exemplary embodiment. As shown in FIG. 1, a display apparatus 100 includes an input unit 110, a display unit 120, and a controller 130. The display apparatus 100 according to an exemplary embodiment may be a television (TV), but this is merely an example. The display apparatus 100 may be realized by various display apparatuses such as a smart phone, a tablet PC, a desktop PC, a monitor, or a projector.

The input unit 110 receives a user command to control the display apparatus 100. In particular, if a character input UI including a plurality of character items is displayed on the display unit 120, the input unit 110 may receive a user command to select one of the plurality of character items.

According to an exemplary embodiment, the input unit 110 may be realized by various input apparatuses such as a pointing device, a motion sensor, a remote controller, or a mouse.

The display unit 120 outputs image data under control of the controller 130. In particular, the display unit 120 may display the character input UI if it is necessary to input a character into the display apparatus 100. At this time, the character input UI is a UI that includes a plurality of character items and a plurality of function items (for example, enter, space, or the like), and may be realized by a virtual keyboard.

The controller 130 controls an overall operation of the display apparatus 100 according to a user command input through the input unit 110. In particular, if the character input UI including the plurality of character items is displayed on the display unit 120, and if one of the plurality of character items is selected through the input unit 110, the controller 130 may display at least one recommended character item associated with the selected character item to partially overlap with an adjacent character item around the selected character item.

Specifically, if one of the plurality of character items is selected, the controller 130 may search for at least one character that is most likely to follow a character included in the selected character item, as a character included in a recommended character item, using a dictionary database and a user database stored in a storage (not shown), and may display the at least one recommended character item around the selected character item. For instance, if "D" is selected from among the plurality of character items, the controller 130 may display character items including "A", "I", "O", and "U", which are most likely to follow "D", around the selected character item, "D", as recommended character items, using the dictionary database and the user database.

If the at least one recommended character item is displayed and done of the at least one recommended character item is selected, the controller 130 may control the display unit 120 to display at least one new recommended character item associated with a combination of a character included in the previously selected character item and a character included in the selected recommended character item around the selected character item. For example, if "O" is selected from among the recommended character items of "D", the controller 130 may display character items including "G", "N", and "P", which are most likely to follow "DO", around the already selected character item, "D", as new recommended character items, using the dictionary database and the user database.

However, after the at least one recommended character item is displayed, if a character item other than the selected character item and the at least one recommended character item is selected, the controller 130 may control the display unit 120 to display at least one new recommended character item associated with a combination of a character included in the previously selected character item and a character included in the newly selected character item around the newly selected character item. For example, if "E" other than the recommended character items of "D" is selected, the controller 130 may display character items including "N", "M", "K", and "C" which are most likely to follow "DE" around the newly selected character item, "E", as new recommended character items, using the dictionary database and the user database.

As described above, the display apparatus 100 allows the user to input a word that the user wishes to input conveniently using a minimum motion.

Figure 2:
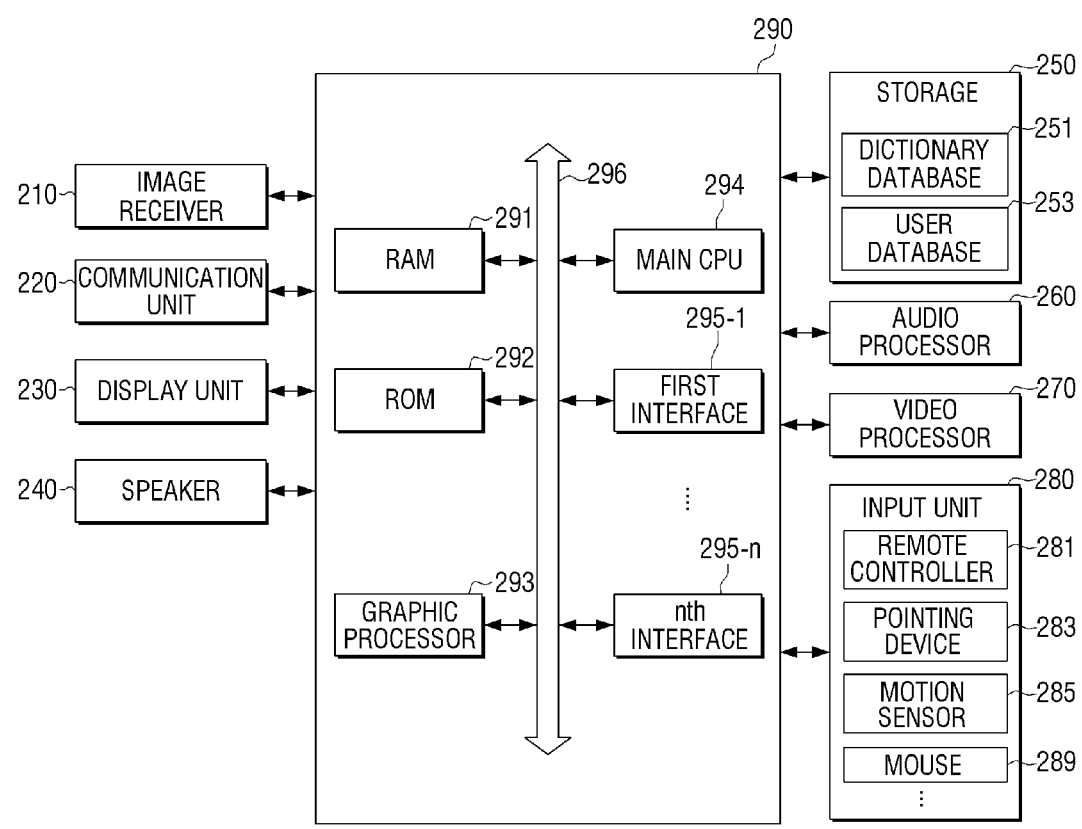
FIG. 2 is a block diagram illustrating a display apparatus 200 in detail according to another exemplary embodiment.

FIG. 2 is a block diagram illustrating a display apparatus 200 in detail according to another exemplary embodiment. As shown in FIG. 2, a display apparatus 200 according to another exemplary embodiment includes an image receiver 210, a communication unit 220, a display unit 230, a speaker 240, a storage 250, an audio processor 260, a video processor 270, an input unit 280, and a controller 290.

The image receiver 210 receives image data from various sources. For example, the image receiver 210 may receive broadcast data from an external broadcasting station, may receive image data from an external apparatus (for example, a digital versatile disc (DVD) or Blu-ray (BD) player), and may receive image data stored in the storage 250.

The communication unit 220 is configured to communicate with various types of external apparatuses or external servers according to various communication methods. The communication unit 220 may include various communication chips such as a WiFi chip, a Bluetooth chip, a near field communication (NFC) chip, and a wireless communication chip. The WiFi chip, the Bluetooth chip, and the NFC chip perform communication in a WiFi method, a Bluetooth method, and an NFC method, respectively. Among these, the NFC chip refers to a chip that is operated in a NFC method using a band of 13.56 MHz from among various RF-ID frequency bands such as 135 kHz, 13.56 MHz, 433 MHz, 860-960 MHz, and 2.45 GHz. In the case of the WiFi chip or the Bluetooth chip, diverse connection information such as an SSID and a session key is exchanged first, and apparatuses are connected to each other using the connection information and exchange diverse information with each other. The wireless communication chip refers to a chip that performs communication according various communication standards such as IEEE, Zigbee, $3^{rd}$ Generation (3G), $3^{rd}$ Generation Partnership Project (3GPP), and long term evolution (LTE).

The display unit 230 displays at least one of image data which is received by the image receiver 210, a video frame which is processed by the video processor 270, and various screens which are generated by a graphic processor 293. In particular, the display unit 210 may display a character input UI (for example, a virtual keyboard) including a plurality of character items. The display unit 210 may display a pointer or a highlight to select a character item on the character item UI.

The speaker 240 is configured to output not only various audio data processed by the audio processor 260 but also various notice sounds or voice messages.

The storage 250 stores various modules to drive the display apparatus 200. For instance, the storage 250 may store software including a base module, a sensing module, a communication module, a presentation module, a web browser module, and a service module. The base module is a module that processes signals transmitted from hardware included in the display apparatus 200 and forwards the signals to an upper layer module. The sensing module is a module that collects information from various sensors, and analyzes and manages the collected information, and may include a face recognition module, a voice recognition module, a motion recognition module, and an NFC recognition module. The presentation module is a module that configures a display screen and may include a multimedia module to reproduce and output multimedia contents, and a UI rendering module to process a UI and graphics. The communication module is a module to communicate with an external apparatus. The web browser module is a module that performs web browsing and accesses a web server. The service module is a module that includes various types of applications to provide various services.

Also, the storage 250 stores a dictionary database 251 and a user database 253 to provide a recommended character to a user. Specifically, the dictionary database 251 is a database on which words having general meanings are recorded, and the user database 253 is a database on which information on words the user has used for a predetermined period is recorded.

Although the dictionary database 251 and the user database 253 are stored in the storage 250 in the above exemplary embodiment, this is merely an example and the dictionary database 251 and the user database 253 may be stored in an external apparatus which is connected through a network.

The audio processor 260 performs processing with respect to audio data. The audio processor 260 may perform various processes such as decoding, amplification, and noise filtering with respect to audio data.

The video processor 270 performs processing with respect to image data received by the image receiver 210. The video processor 270 may perform various processing operations such as decoding, scaling, noise filtering, frame rate conversion, and resolution conversion with respect to image data.

The input unit 280 is configured to receive a user command to control an overall operation of the display apparatus 200. In particular, the input unit 280 may receive a pointer movement command and a selection command to select one of the plurality of character items. Also, the input unit 280 may receive a command to move and select a highlight displayed on the plurality of character items.

As shown in FIG. 2, the input unit 280 may be realized by various input apparatuses such as a remote controller 281, a pointing device 283, a motion sensor 285 to sense a user's motion, and a mouse 289.

The controller 290 controls an overall operation of the display apparatus 200 using various programs stored in the storage 250.

As shown in FIG. 2, the controller 290 includes a random access memory (RAM) 291, a read only memory (ROM) 292, a graphic processor 293, a main central processing unit (CPU) 294, first to nth interfaces 295-1 to 295-n, and a bus 296. At this time, the RAM 291, the ROM 292, the graphic processor 293, the main CPU 294, and the first to the nth interfaces 295-1 to 295-n may be connected to one another through the bus 296.

The ROM 292 stores a set of commands to boot a system. If a turn on command is input and power is supplied, the main CPU 294 copies an operating system (O/S) stored in the storage 250 into the RAM 291 according to a command stored in the ROM 292, executes the O/S, and boots the system. If booting is completed, the main CPU 294 copies various applications stored in the storage 250 into the RAM 291, executes the applications copied into the RAM 291, and performs various operations.

The graphic processor 293 generates a screen including various objects such as an icon, an image, and a text using a calculator (not shown) and a renderer (not shown). The calculator calculates attribute values such as a coordinates value, a shape, a size, and a color of each object to be displayed according to a layout of the screen using a control command received from the input unit 280. The renderer generates screens of various layouts including an object based on the attribute value calculated by the calculator. The screen generated by the renderer is displayed on a display region of the display unit 230.

The main CPU 294 accesses the storage 250 and performs booting using the O/S stored in the storage 250. The main CPU 294 performs various operations using various programs, contents, and data stored in the storage 250.

The first to the nth interfaces 295-1 to 295-n are connected to the above-described various elements. One of the interfaces may be a network interface that is connected to an external apparatus through a network.

In particular, if the display unit 230 includes a character input UI including a plurality of character items, and, if a first character item is selected from among the plurality of character items through the input unit 280, the controller 290 displays at least one recommended character item associated with the first character item around the first character item. At this time, the character input UI may be a virtual keyboard and the character item may include a key border of a predetermined shape (for example, a square) and a character included in the key border (for example, alphabets or figures).

Figure 3:
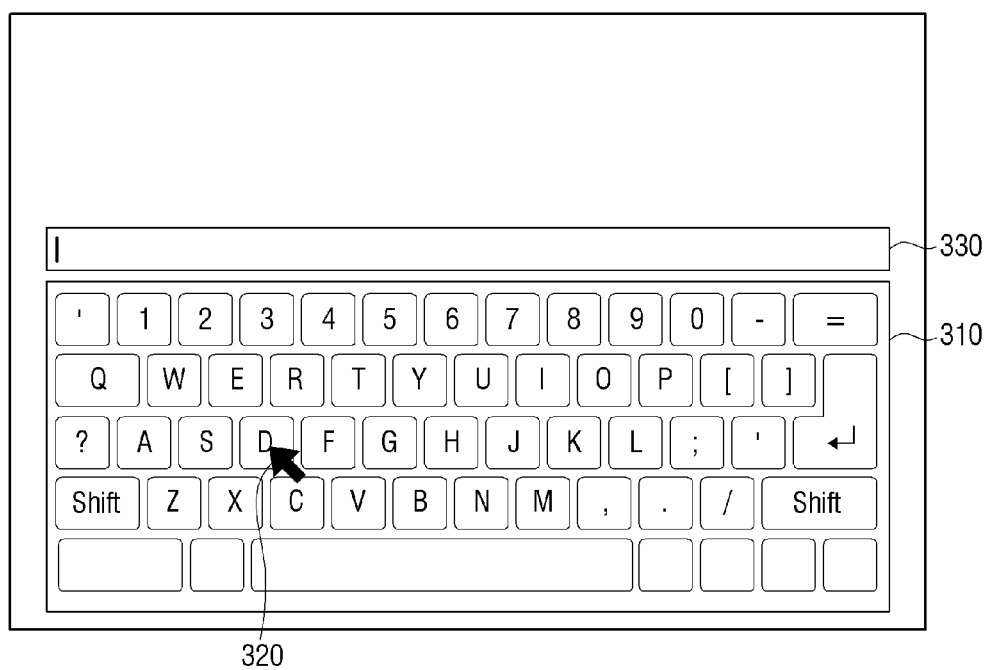
FIGS. 3 to 14 are views to explain a method for inputting characters according to various exemplary embodiments.

Specifically, in a state in which a character input UI 310, a pointer 320, and a character input window 330 are displayed as shown in FIG. 3, if the user selects the character item "D" through the input unit 280, the controller 290 may search for a recommended character item associated with the character item "D" using the dictionary database 251 and the user database 253 stored in the storage 250. More specifically, the controller 290 may search for at least one character that is most likely to follow the character item "D", as at least one recommended character item associated with the character item "D", using the dictionary database 251 and the user database 253. For example, the controller 290 may search for "A", "E", "I", and "O" as characters included in the recommended character items of the character item "D" using the dictionary database 251 and the user database 253.

At this time, the controller 290 may use the user database 253 first, prior to using the dictionary database 251 to search for the recommended character item. For example, the controller 290 may use the user database 253 on which information on words that the user has used for a predetermined period is recorded first, and then additionally may use the dictionary database 251.

In particular, if the at least one recommended character item associated with the first character item is the same as a character item adjacent to the first character item, the controller 290 may control the display unit 230 to exclude the adjacent character item and display a next recommended character item. That is, the controller 290 searches for a recommended character item using the dictionary database 251 and the user database 253, calculates a distance between a location of a character corresponding to the recommended character item and a location of the first character item, and selects only a character item of which a calculated distance is less than a predetermined value as a recommended character item. For example, if "A", "E", "I", and "O" are searched as recommended character items of the character item "D" using the dictionary database 251 and the user database 253, the controller 290 excludes "E" which is adjacent to the character item "D" from the recommended character items and provides the next character item "U" as a recommended character item. As described above, by excluding the adjacent character item, the user may be provided with more recommended character items.

As described above, if at least one recommended character item is searched, the controller 290 may display the searched at least one recommended character item around the selected first character item. Specifically, after at least one recommended character item is searched, the controller 290 may display at least one recommended character item 410-1, 410-

Figure 18:
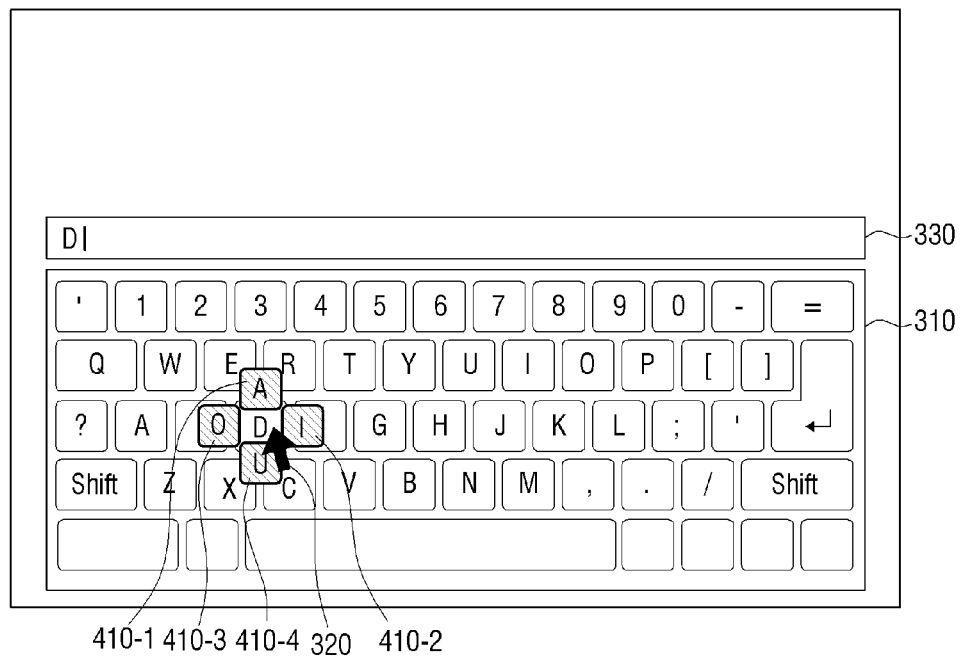
FIG. 18 is a view illustrating a character input UI according to another exemplary embodiment.

2, 410-3, and 410-4 to overlap with the character "D" included in the selected character item and some of the characters (W, E, R, S, F, X, C, and V) included in adjacent other character items. At this time, the at least one recommended character items 410-1, 410-2, 410-3, and 410-4 may be located on four corners of the selected character item "D". However, although the at least one recommended character item 410-1, 410-2, 410-3, and 410-4 may be located on the four corners of the selected character item "D" as described above, this is merely an example, and the at least one recommended character items 410-1, 410-2, 410-3, and 410-4 may be located on four sides, upper, lower, right, and left sides of the selected character items "D" as shown in FIG. 18.

Figure 4:
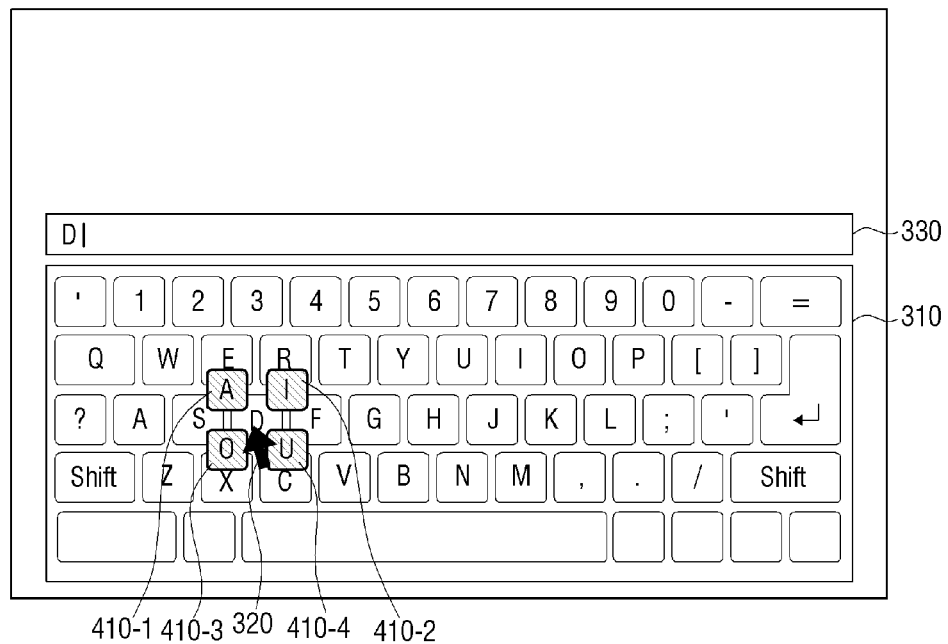

For example, if "A", "I", "O", and "U" are searched as recommended character items of the character item "D" selected through the input unit 280, the controller 290 may display the four recommended character items 410-1, 410-2, 410-3, and 410-4 on the four corners of the selected character item "D" as shown in FIG. 4.

Although the number of recommended character items 410-1, 410-2, 410-3, and 410-4 is four in FIG. 4, this is merely an example and the technical idea of the present disclosure can be applied if one or more recommended character items are searched.

Also, the controller 290 may control the display unit 250 to display the plurality of character items included in the character input UI 310 and the at least one recommended character item in different ways. For example, the controller 290 may display at least one of color, brightness, size, and transparency of the at least one recommended character item differently from that of the plurality of character items included in the character input UI 310. Also, the controller 290 may display the at least one recommended character item by making it flicker or by highlighting it. At this time, the character item which is adjacent to the first character item and thus is excluded from the recommended character items may be regarded as a recommended character item and may be displayed differently from the plurality of character items included in the character input UI 310.

The controller 290 may control the display unit 250 to display a highlight for the user and display a current focus when selecting one of the plurality of character items included in the character input UI 310 and at least one recommended character item. For example, when the controller 290 selects one of the plurality of character items included in the character input UI 310, places at least one recommended character item around the selected character item, and selects one of the at least one recommended character item, the controller 290 displays at least one of color, brightness, size, and transparency differently, and then moves a focus highlight to the first character item. For another example, when the controller 290 selects one of the plurality of character items included in the character input UI 310, places at least one recommended character item around the selected character item, and selects one of the at least one recommended character item, the controller 290 may display at least one of color, brightness, size, and transparency differently, and may display a focus highlight on the selected recommended character item.

As shown in FIG. 4, the controller 290 may enter the character "D" selected by the user into a character input window 330.

After at least one recommended character item is displayed, if a first recommended character item is selected from among the at least one recommended character item through the input unit 280, the controller 290 may control the display unit 230 to display at least one new recommended character item associated with a combination of a character included in the first character item and a character of the first recommended character item around the first character item.

Figure 5:
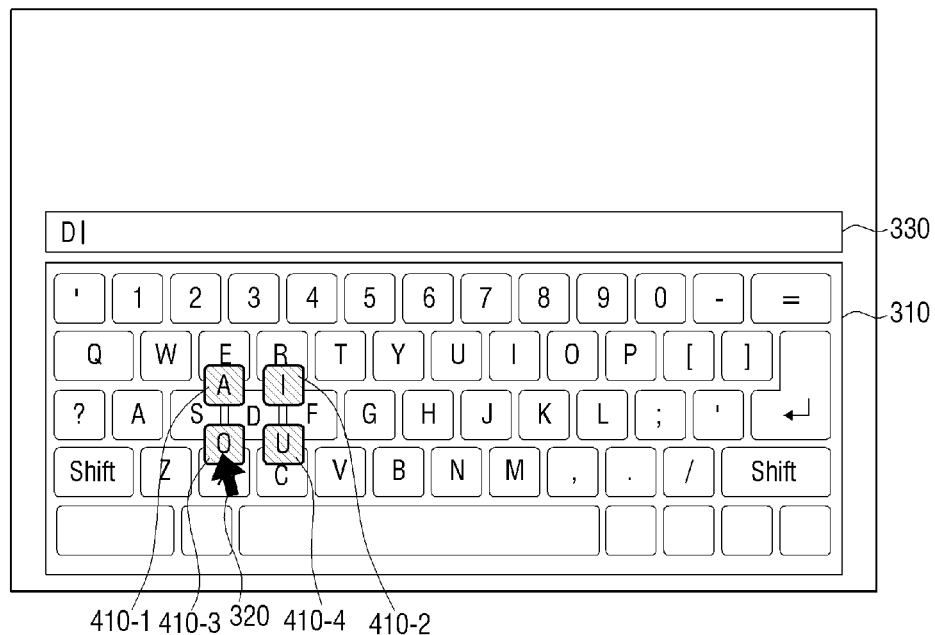
Figure 6:
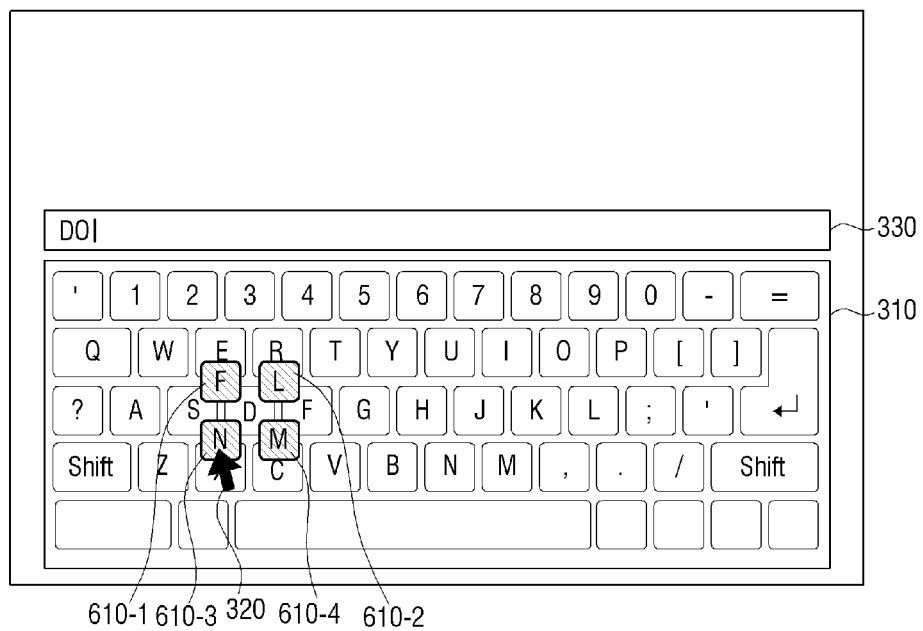

For example, after four recommended character items 410-1, 410-2, 410-3, and 410-4 are displayed around the first selected character item "D", if the recommended character item "O" is secondarily selected through the input unit 280 as shown in FIG. 5, the controller 290 may search for at least one recommended character item associated with "DO" selected by the user, and then, may control the display unit 230 to display character items including searched new recommended characters "F", "N", and "M", corresponding to 610-1, 610-2, 610-3, and 610-4, respectively, around the first selected character item "D".

If the recommended character item is secondarily selected, the first selected character item may continue to be displayed as "D". However, this is merely an example and the first selected character item may be changed to "O". In this case, the character item on which the character "O" was originally located may be changed to "D".

As described above, if one of the recommended character items is selected, a region on which a new recommended character item is displayed is not changed so that a user's motion to move a pointer to input a character can be minimized.

The controller 290 may display a highest priority recommended character item from among at least one recommended character item associated with "DO", which was selected by the user, on a location of the character item "O" 410-3 which is the most recent recommended character item that the user has selected. If one of the recommended character items is selected, the region on which the new recommended character item is displayed is not changed and the highest priority recommended character item from among the new recommended character items is placed on a highlighted region, so that the user's motion to move the pointer to input a character can be minimized.

The controller 290 may enter "DO" selected by the user into the character input window 330 as shown in FIG. 5.

After at least one recommended character item is displayed, if a second character item other than the first character item and the at least one recommended character item is selected through the input unit 280, the controller 290 may control the display unit 230 to display at least one recommended character item associated with a combination of a character included in the first character item and a character included in the second character item around the second character item.

Figure 7:
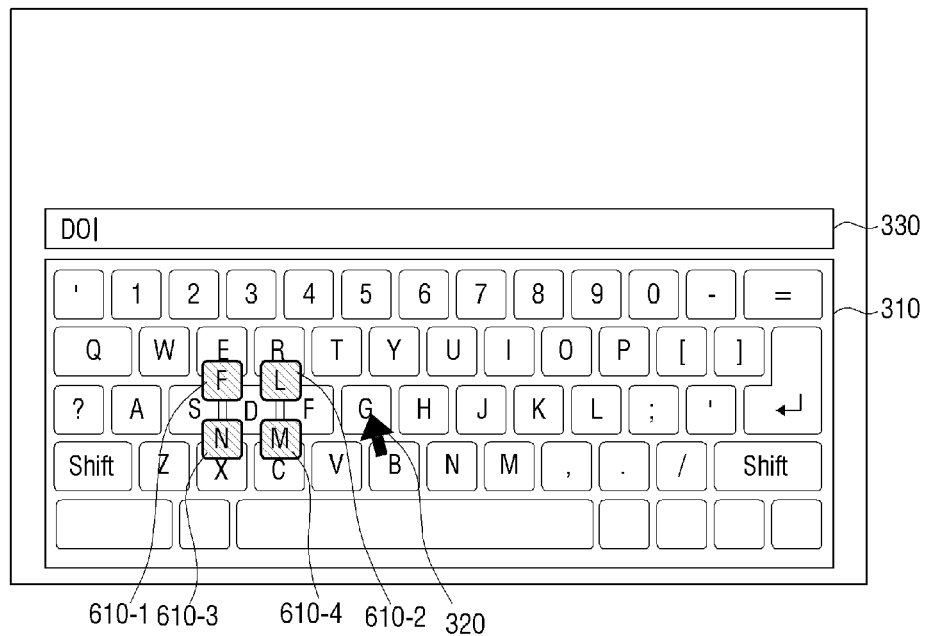
Figure 8:
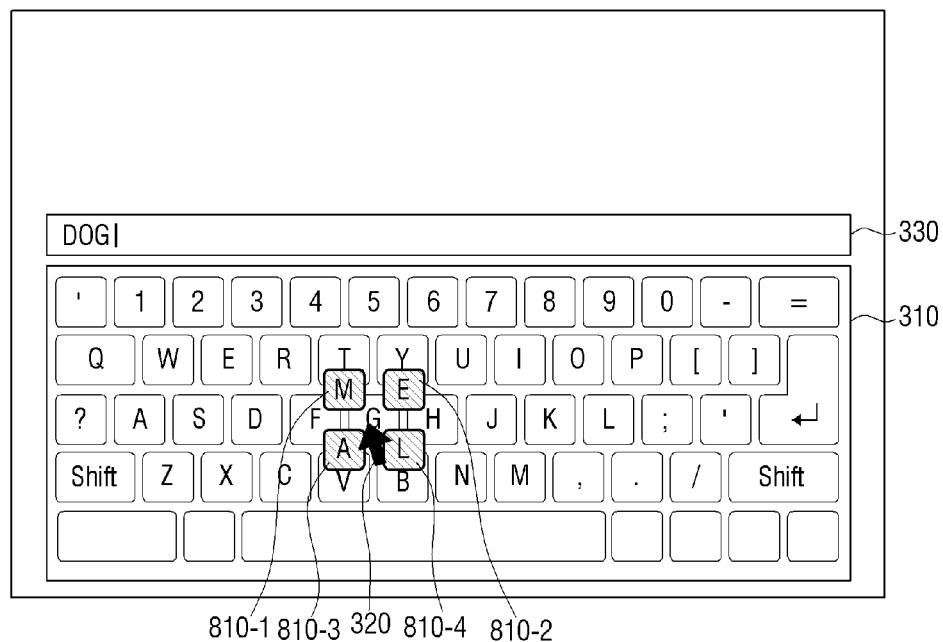

For example, after the first and the second character items are selected and then four recommended character items 610-1, 610-2, 610-3, and 610-4 are displayed around the character item "D", if a character item "G" other than the recommended character items 610-1, 610-2, 610-3, and 610-4 is thirdly selected through the input unit 280 as shown in FIG. 7, the controller 290 searches for at least one recommended character item associated with "DOG" selected by the user, and then may control the display unit 230 to display newly searched recommended character items "M", "E", "A", and "L", corresponding to 810-1, 810-2, 810-3, and 810-4, respectively, around the third character item "G".

According to still another exemplary embodiment, if a first character item is selected through the input unit 280, the controller 290 may control the display unit 230 to display a refresh item on the character input UI.

The refresh item is a function item that searches for a most likely next recommended character item if there is no character item that the user wishes to select from among initially displayed recommended character items, and displays the next recommended character item.

Figure 9:
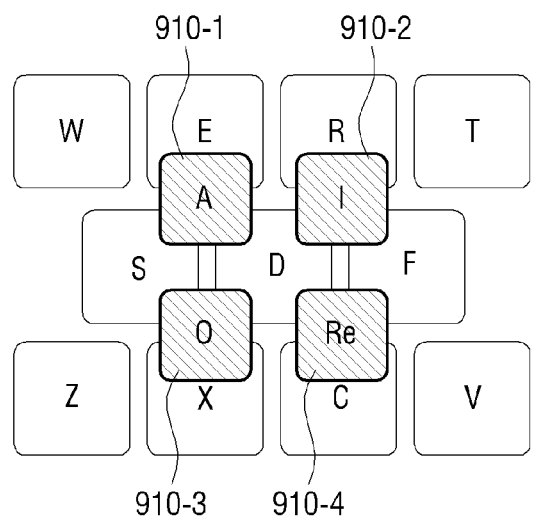

For example, if the character item "D" is selected through the input unit 280, the controller 290 may display three recommended character items "A", "I", and "O", corresponding to 910-1, 910-2, and 910-3, respectively, and a refresh item "Re" 910-4 as shown in FIG. 9.

Figure 10:
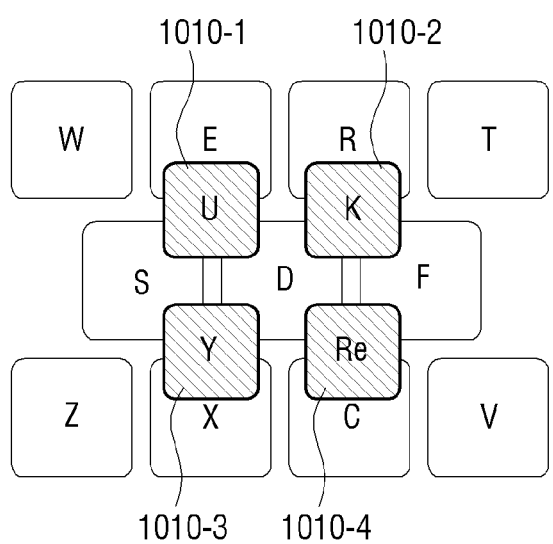
Figure 11:
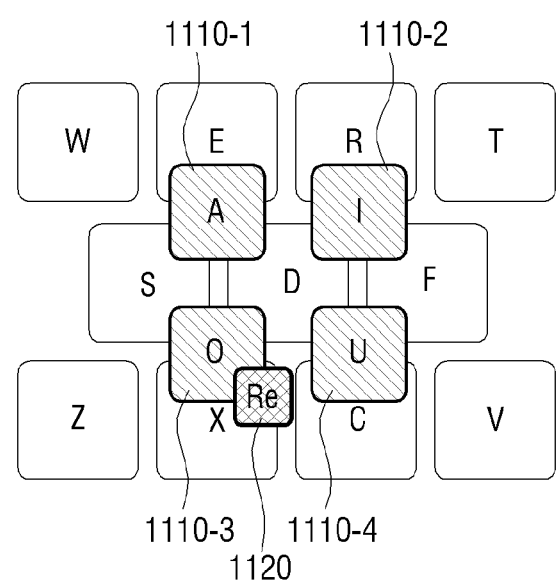

If the refresh item 910-4 is selected through the input unit 280, the controller 290 may change the at least recommended character item associated with the character item "D" to most likely next recommended character items "U", "K", and "Y", corresponding to 1010-1, 1010-2, and 1010-3, respectively, and may display the changed recommended character items as shown in FIG. 10.

The refresh item may be displayed on a region on which the recommended character items are displayed as shown in FIGS. 9 and 10. However, this is merely an example and the refresh item may be display on another region in the character input UI 320. For example, a refresh item 1120 may be displayed adjacent to a recommended character item 1110-3.

According to an exemplary embodiment, the controller 290 may display a function item to provide various functions besides the recommended character item. The function item may include at least one of a space item to perform a space bar function, an enter key item to perform an enter key function, a delete item to delete a previously input character, and a special character item to input a special character.

Specifically, a combination of characters input through the input unit 280 may be one of the words stored in the dictionary database 251 and the user database 253 stored in the storage 250. However, if a new word may be formed by inputting other characters, the controller 290 may control the display unit 250 to additionally display at least one function item besides the at least one recommended character item.

Figure 12:
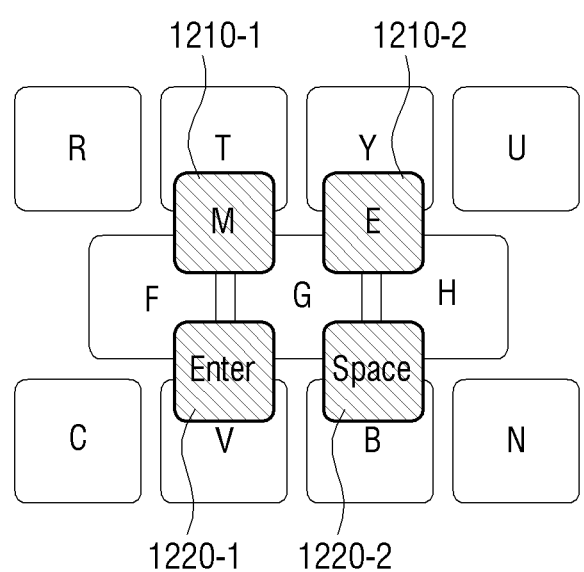

For example, if a combination of characters input through the input unit 280 is a single complete word like "DOG" and "SELECT", but may form a new word using other characters, the controller 290 may control the display unit 250 to display two recommended character items 1210-1 and 1210-2 and two function items 1220-1 and 1220-2, as shown in FIG. 12.

If a combination of characters input through the input unit 280 is one of the words stored in the dictionary database 251 and the user database 253 and cannot form a new word using other characters, the controller 290 may control the display unit 250 to remove at least one recommended character item and display at least one function item.

Figure 13:
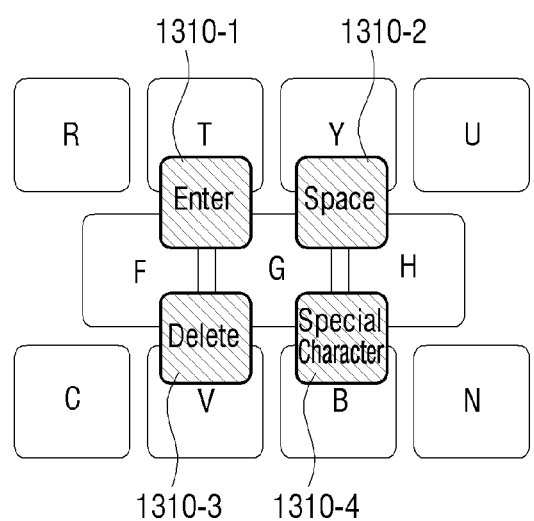

For example, if a combination of characters input through the input unit 280 cannot form a new word using other characters like "SELECTION" and "BEAUTIFULLY", the controller 290 may control the display unit 250 to display four function items 1310-1, 1310-2, 1310-3, and 1310-4 as shown in FIG. 13.

If a combination of characters input through the input unit 280 is not a word that is stored in the dictionary database 251 and the user database 253, the controller 290 may control the display unit 250 to remove at least one recommended character item and display at least one function item on a region on which the at least one recommended character item is displayed.

For example, if a combination of characters input through the input unit 280 is not a word that is stored in the dictionary database 251 and the user database 253 like "SWEETYKS", the controller 290 may control the display unit 250 to display the four function items 1310-1, 1310-2, 1310-3, and 1310-4 as shown in FIG. 13.

In particular, if a command to input the word which is not stored in the dictionary database 251 is received using the displayed at least one function item, the controller 290 may record the word which is input in the user database 253.

For example, if a combination of input characters is "SWEETYKS", and if the enter key item 1310-1 or the space item 1310-2 is selected from the displayed function items, the controller 290 may record "SWEETYKS" in the user database 253.

As described above, the word that is not stored in the dictionary database 251 (e.g., similar to an ID) is registered at the user database 253, so that the user can input the word that is not stored in the dictionary database 251 more easily afterwards.

However, if a password is input using the character input UI, the controller 290 may not display at least one recommended character item. Specifically, since the password should be securely protected, the controller 290 may not provide a recommended character item if the password is input, and may not store a combination of characters input as a password in the user database 253.

In the above exemplary embodiments shown in FIGS. 3 to 13, the recommended character item and the function item are displayed to partially overlap with the selected character item and character items adjacent to the selected character item. However, this is merely an example and the recommended character item and the function item may be displayed in a different way.

Figure 14:
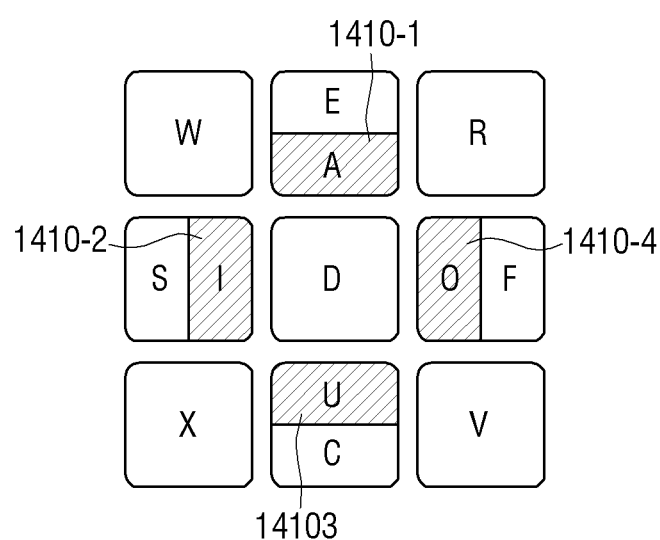

For example, if a character item is selected using four direction keys as on a remote controller, the controller 290 may display a recommended character item on a partial region of each of the character items which are located on upper, lower, right, and left sides of the selected character item as shown in FIG. 14.

As described above, the user can input characters more easily using the character input UI through the display apparatus 200.

Hereinafter, a method for inputting characters according to various exemplary embodiments will be explained with reference to FIGS. 15 to 17.

Figure 15:
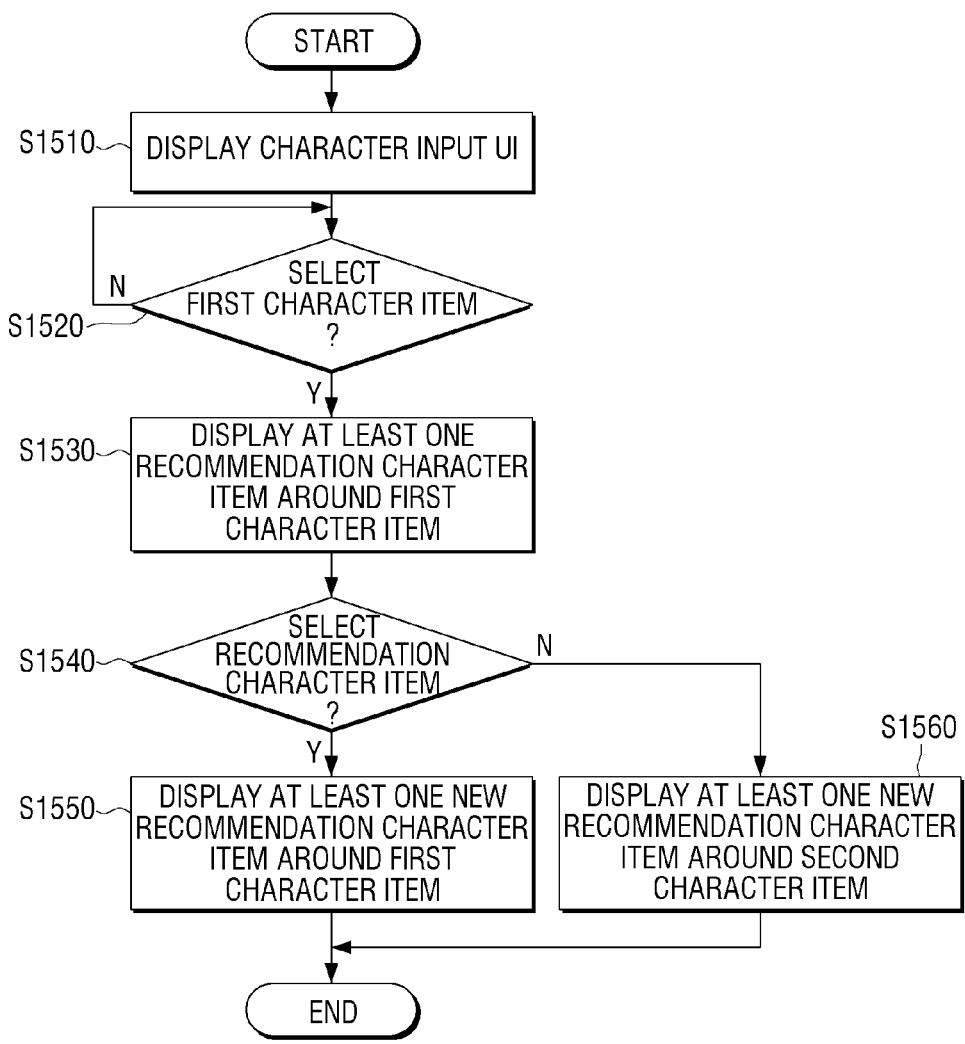
FIGS. 15 to 17 are flowcharts to explain a method for inputting characters according to various exemplary embodiments.

FIG. 15 is a flowchart to explain a method for inputting characters of the display apparatus 200 according to an exemplary embodiment.

First, the display apparatus 200 displays a character input UI including a plurality of character items to input characters (S1510). The character input UI includes a plurality of character items and each character item includes a border and a character included in the border.

The display apparatus 200 determines whether a first character item is selected from among the plurality of character items or not (S1520).

If the first character item is selected (S1520-Y), the display apparatus 200 displays at least one recommended character item around the first character item (S1530). Specifically, the display apparatus 200 searches for a recommended character item associated with a character included in the character item selected by the user using at least one of the dictionary database 251 and the user database 253. The display apparatus 200 may display the searched recommended character item to partially overlap with other character items adjacent to the selected character item.

The display apparatus 200 determines whether a first recommended character item is selected from among the displayed at least one recommended character item or not (S1540).

If the first recommended character item is selected (S1540-Y), the display apparatus 200 displays at least one new recommended character item around the first character item (S1550). Specifically, if the first recommended character item is selected, the display apparatus 200 may search for a recommended character item associated with the character included in the first character item selected by the user and a character included in the first recommended character item using at least one of the dictionary database 251 and the user database 253. The display apparatus 200 may display the searched recommended character item to partially overlap with other character items adjacent to the already selected first character item.

On the other hand, if the first recommended character item is not selected (S1540-N), and a second character item in the character input UI is selected, the display apparatus 200 displays at least one new recommended character item around the second character item (S1560). Specifically, after the first character item is selected, if the second character item other than the recommended character item is selected, the display apparatus 200 may search for a recommended character item associated with the character included in the first character item selected by the user and a character included in the second character item using at least one of the dictionary database 251 and the user database 253. Also, the display apparatus 200 may display the searched recommended character item to partially overlap with other character items adjacent to the newly selected second character item.

Figure 16:
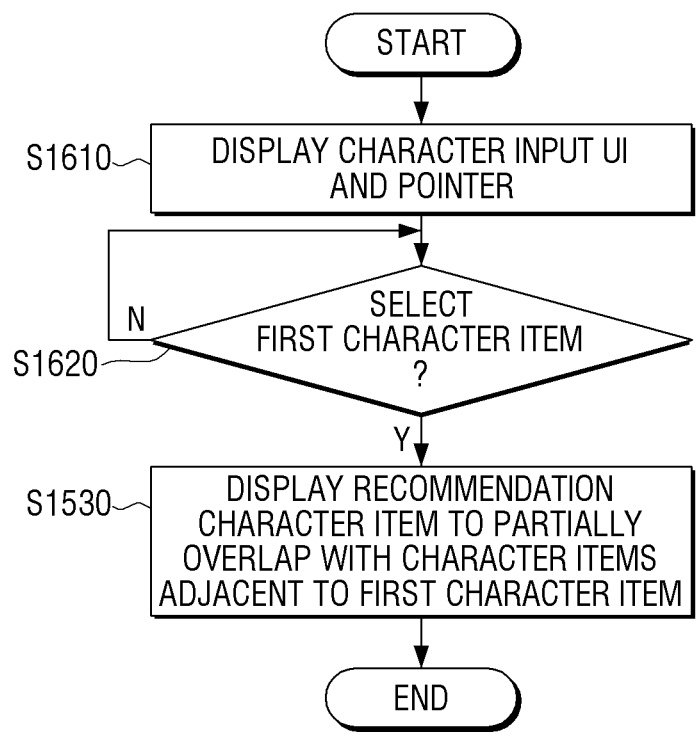

FIG. 16 is a flowchart illustrating a method for inputting characters of the display apparatus 200 according to another exemplary embodiment.

The display apparatus 200 displays a character input UI and a pointer to input characters (S1610). At this time, the character input UI includes a plurality of character items and each character item includes a border and a character included in the border.

The display apparatus 200 determines whether a first character item is selected using the pointer or not (S1620).

If the first character item is selected using the pointer (S1620-Y) the display apparatus 200 displays a recommended character item to partially overlap with other character items adjacent to the first character item (S1630). Specifically, the display apparatus 200 searches for at least one recommended character item associated with a character included in the first character item using the dictionary database 251 and the user database 253, and displays the searched recommended character item to partially overlap with other character items adjacent to the selected character item on corners of the selected first character item, as shown in FIG. 4. If the at least one recommended character item associated with the first character item is the same as one of the character item adjacent to the first character item, the display apparatus 200 excludes the adjacent character item from the recommended character item and displays a most likely next recommended character item.

As described above, the recommended character item is displayed to partially overlap with the adjacent character items, so that the user can select not only the recommended character item but also the adjacent character items.

Figure 17:
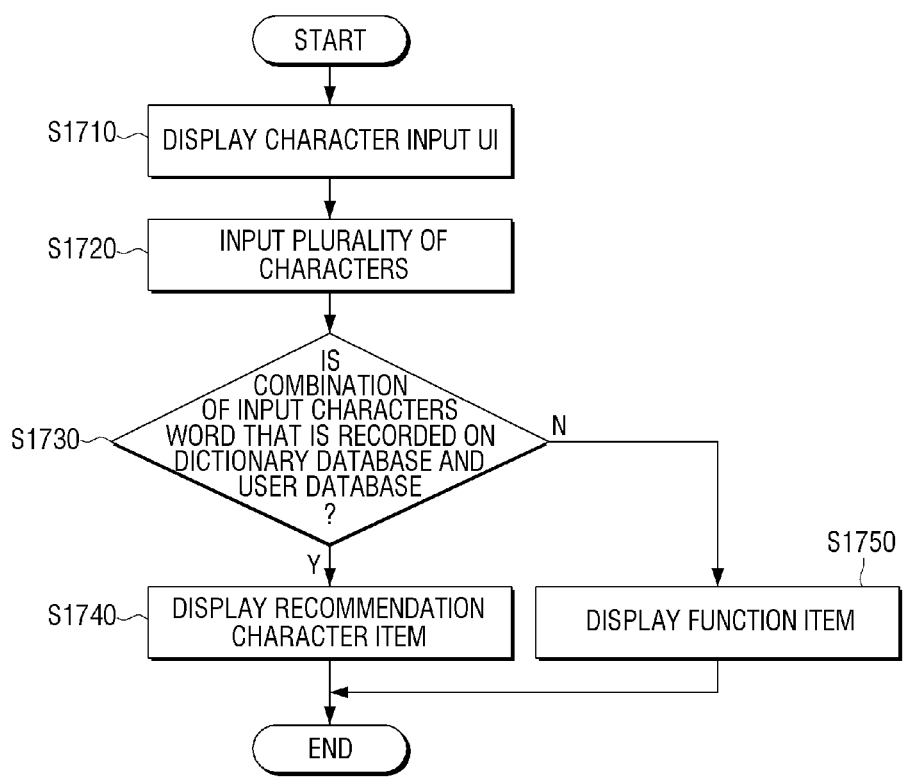

FIG. 17 is a flowchart to explain a method for inputting characters of the display apparatus 200 according to still another exemplary embodiment.

First, the display apparatus 200 display a character input UI including a plurality of character items to input characters (S1710). The character input UI includes a plurality of character items and each character item includes a border and a character included in the border.

The display apparatus 200 receives user's input of a plurality of characters using the character input UI (S1720).

The display apparatus 200 determines whether a combination of the plurality of characters input by the user is a word that is recorded on the dictionary database 251 and the user database 253 (S1730).

If the combination of the plurality of characters input by the user is a word that is recorded on the dictionary database 251 and the user database 253 (S1730-Y), the display apparatus 100 displays a recommended character item associated with the combination of the plurality of characters (S1740).

However, if the combination of the plurality of characters input by the user is not a word that is recorded on the dictionary database 251 and the user database 253 (S1730-N), the display apparatus 200 displays a function item (S1750). If a character input command item of the function item (for example, a space item or an enter key item) is selected, the display apparatus 200 may record the combination of the plurality of characters input by the user on the user database.

According to the above-described various exemplary embodiments, at least one of the recommended character item and the function item is provided around the character item selected by the user on the character input UI, so that the user can input characters more easily using the character input UI.

The method for inputting characters of the display apparatus according to the above-described various exemplary embodiments may be realized by a program and may be provided to the display apparatus.

Specifically, a non-transitory computer readable medium, which stores a program including: a first display operation which displays a character input UI including a plurality of character items, a second display operation which, if a first character item is selected from among the plurality of character items by the user, displays at least one recommended character item associated with the first character item around the first character item, and a third display operation which, if a first recommended character item is selected from among the at least one recommended character item, displays at least one new recommended character item associated with a combination of the first character item and the first recommended character item around the first character item, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a DVD, a hard disk, a Blu-ray disk, a universal serial bus (USB), a memory card, and a ROM, and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display which displays an input user interface (UI) comprising a plurality of character items;
   an inputter configured to receive a command to select one of the plurality of character items; and
   a controller configured to determine at least one recommended character item associated with a first character item, if the first character item is selected from among the plurality of character items, wherein the at least one recommended character item is displayed to partially overlap with the first character item and character items adjacent to the first character item, and wherein, upon a condition that a recommended character determined for the first character item is a same character as a character included in a character item located within a predetermined distance from the first character item, the controller changes the recommended character.

2. The display apparatus as claimed in claim 1, wherein, if a first recommended character item is selected from among the at least one recommended character item through the inputter, the controller controls the display to display at least one new recommended character item associated with a combination of a character included in the first character item and a character included in the first recommended character item, around the first character item.

3. The display apparatus as claimed in claim 1, wherein, after the at least one recommended character item is selected, if a second character item other than the first character item and the at least one recommended character item is selected, the controller controls the display to display at least one recommended character item associated with a combination of a character included in the first character item and a character included in the second character item, around the second character item.

4. The display apparatus as claimed in claim 1, further comprising a storage which stores a dictionary database and a user database in which information related to words that a user has used is recorded, wherein the controller searches for at least one character that is likely to follow a character included in the first character item, as at least one recommended character associated with a character included in the first character item, using the dictionary database and the user database, and displays the searched at least one character.

5. The display apparatus as claimed in claim 4, wherein, if the first character item is selected through the inputter, the controller controls the display to display a refresh item in the input UI, wherein, if the refresh item is selected through the inputter, the controller changes a character included in the at least one recommended character item associated with the character included in the first character item to at least one likely next character from among characters that follow the character included in the first character item.

6. The display apparatus as claimed in claim 5, wherein the controller controls the display to display the refresh item at a region at which the at least one recommended character item is displayed.

7. The display apparatus as claimed in claim 4, wherein, if a combination of characters input through the inputter is one of words that are stored in at least one from among the dictionary database and the user database, and is capable of forming a new word using other characters, the controller controls the display to additionally display at least one function item in addition to the at least one recommended character item.

8. The display apparatus as claimed in claim 4, wherein, if a combination of characters input through the inputter is one of words that are stored in at least one from among the dictionary database and the user database and is not capable of forming a new word using other characters, the controller controls the display to display at least one function item.

9. The display apparatus as claimed in claim 4, wherein, if a combination of characters input through the inputter is not a word that is stored in at least one from among the dictionary database and the user database, the controller controls the display to display at least one function item at a region at which the at least one recommended character item is to be displayed.

10. The display apparatus as claimed in claim 7, wherein the at least one function item comprises at least one from among a space item to perform a space bar function, an enter key item to perform an enter key function, a delete item to delete a previously input character, and a special character item to input a special character.

11. The display apparatus as claimed in claim 9, wherein, if a command to input a word that is not stored in the dictionary database is received using the displayed at least one function item, the controller records the word corresponding to the input command in the user database.

12. The display apparatus as claimed in claim 1, wherein, if a password is input using the input UI, the controller does not display the at least one recommended character item.

13. The display apparatus as claimed in claim 1, wherein the at least one recommended character item associated with the first character item is placed on a corner of the first character item to overlap with character items adjacent to the first character item.

14. The display apparatus as claimed in claim 1, wherein the controller displays the plurality of character items included in the input UI and the at least one recommended character item in different ways.

15. The display apparatus as claimed in claim 14, wherein, upon a condition that a recommended character determined for the first character item is a same character as a character included in a character item which is located within a predetermined distance from the first character item, the controller displays the character item located within the predetermined distance and the at least one recommended character item in a different way from that of other character items included in the input UI.

16. The display apparatus as claimed in claim 1, wherein the inputter is at least one from among a pointing device, a motion sensor, a mouse, a remote controller, and a touch panel.

17. The display apparatus as claimed in claim 1, wherein each character item comprises a border and a character located in the border.

18. The display apparatus as claimed in claim 1, wherein the at least one recommended character item partially overlaps with the character item adjacent to the first character item.

19. The display apparatus as claimed in claim 18, wherein the character item adjacent to the first character item is selectable by a user.

20. The display apparatus as claimed in claim 4, wherein the controller first searches the user database prior to searching the dictionary database for the at least one character that is likely to follow the character included in the first character item.

21. The display apparatus as claimed in claim 14, wherein the controller displays the at least one recommended character item by at least one from flickering the at least one recommended character item and highlighting the at least one recommended character item.

22. The display apparatus as claimed in claim 2, wherein a character associated with the selected first recommended character item is displayed in a location of a character associated with the first character item.

23. The display apparatus as claimed in claim 8, wherein the controller controls the display to display only the at least one function item instead of the at least one recommended character item.

24. The display apparatus as claimed in claim 1, wherein a keyboard comprises all the plurality of character items and all of the plurality of character items are visible when the at least one recommended character item is displayed.

25. A method for inputting characters, the method comprising:
    displaying an input user interface (UI) comprising a plurality of character items; and
    if a first character item is selected from among the plurality of character items, determining at least one recommended character item associated with the first character item and displaying the at least one recommended character item,
    wherein the at least one recommended character item is displayed to partially overlap with the first character item and character items adjacent to the first character item, and
    the method further comprising: upon a condition that a recommended character determined for the first character item is a same character as a character included in a character item which is located within a predetermined distance from the first character item, changing the recommended character and displaying the changed recommended character.

26. The method as claimed in claim 25, further comprising: if a first recommended character item is selected from among the at least one recommended character item, displaying at least one new recommended character item associated with a combination of a character included in the first character item and a character included in the first recommended character item, around the first character item.

27. The method as claimed in claim 25, further comprising: after the at least one recommended character item is displayed, if a second character item other than the first character item and the at least one recommended character item is selected, displaying at least one recommended character item associated with a combination of a character included in the first character item and a character included in the second character item, around the second character item.

28. The method as claimed in claim 25, further comprising searching for at least one character that is likely to follow a character included in the first character item, as at least one recommended character associated with a character included in the first character item, using at least one from among a dictionary database and a user database in which information on words that a user has used is recorded, and displaying the searched at least one character.

29. The method as claimed in claim 28, further comprising:
    if the first character item is selected, displaying a refresh item in the input UI; and
    if the refresh item is selected, changing a character included in the at least one recommended character item associated with the character included in the first character item to at least one likely next character from among characters that follow the character included in the first character item.

30. The method as claimed in claim 29, wherein the displaying the refresh item comprises displaying the refresh item on a region on which the at least one recommended character item is displayed.

31. The method as claimed in claim 28, further comprising, if a combination of characters input by a user is one of words that are stored in at least one from among the dictionary database and the user database and is capable of forming a new word using other characters, additionally displaying at least one function item in addition to the at least one recommended character item.

32. The method as claimed in claim 28, further comprising, if a combination of characters input by a user is one of words that are stored in at least one from among the dictionary database and the user database and is not capable of forming a new word using other characters, displaying at least one function item.

33. The method as claimed in claim 28, further comprising, if a combination of characters input by a user is not a word that is stored in at least one from among the dictionary database and the user database, displaying at least one function item on a region on which the at least one recommended character item is to be displayed.

34. The method as claimed in claim 31, wherein the at least one function item comprises at least one from among a space item to perform a space bar function, an enter key item to perform an enter key function, a delete item to delete a previously input character, and a special character item to input a special character.

35. The method as claimed in claim 33, further comprising, if a command to input a word that is not stored in the dictionary database is received using the displayed at least one function item, recording the word corresponding to the input command in the user database.

36. The method as claimed in claim 25, further comprising, if a password is input using the input UI, not displaying the at least one recommended character item.

37. The method as claimed in claim 25, further comprising displaying the at least one recommended character item associated with the first character item on a corner of the first character item to overlap with character items adjacent to the first character item.

38. The method as claimed in claim 25, further comprising displaying the plurality of character items included in the input UI and the at least one recommended character item in different ways.

39. The method as claimed in claim 25, further comprising, upon a condition that the recommended character determined for the first character item is the same character as the character included in the character item which is located within a predetermined distance from the first character item, displaying the character item located within the predetermined distance and the at least one recommended character item in a different way from that of other character items included in the input UI.

40. The method as claimed in claim 25, wherein a display apparatus performs the displaying operations and the display apparatus receives a user command using at least one from among a pointing device, a motion sensor, a mouse, a remote controller, and a touch panel.

41. The method as claimed in claim 25, wherein each character item comprises a border and a character located in the border.

42. The method as claimed in claim 25, wherein the at least one recommended character item partially overlaps with the character item adjacent to the first character item.

43. The method as claimed in claim 42, wherein the character item adjacent to the first character item is selectable by a user.

44. The method as claimed in claim 28, wherein the user database is searched before the dictionary database for the at least one character that is likely to follow the character included in the first character item.

45. The method as claimed in claim 38, wherein the displaying the at least one recommended character item comprises at least one from among flickering the at least one recommended character item and highlighting the at least one recommended character item.

46. The method as claimed in claim 26, wherein a character associated with the selected first recommended character item is displayed in a location of a character associated with the first character item.

47. The method as claimed in claim 32, wherein only the at least one function item is displayed instead of the at least one recommended character item.

48. The method as claimed in claim 25, wherein a keyboard comprises all the plurality of character items and all of the plurality of character items are visible when the at least one recommended character item is displayed.

49. A non-transitory computer readable medium which stores a program for executing a method for inputting characters, the method comprising:
- displaying an input user interface (UI) comprising a plurality of character items; and
- if a first character item is selected from among the plurality of character items, determining at least one recommended character item associated with the first character item and displaying the at least one recommended character item,
- wherein the at least one recommended character item is displayed to overlap with a character item adjacent to the first character item, and
- the method further comprising: upon a condition that a recommended character determined for the first character item is a same character as a character included in a character item which is located within a predetermined distance from the first character item, changing the recommended character and displaying the changed recommended character.

50. The non-transitory computer readable medium as claimed in claim 49, wherein a keyboard comprises all the plurality of character items and all of the plurality of character items are visible when the at least one recommended character item is displayed.

* * * * *